Feb. 26, 1929.

H. J. KERR 1,703,426

BOILER GAUGE GLASS

Filed Oct. 20, 1924

INVENTOR
Howard J. Kerr
BY
Gifford & Scull
ATTORNEYS

Patented Feb. 26, 1929.

1,703,426

UNITED STATES PATENT OFFICE.

HOWARD J. KERR, OF EL MORA, NEW JERSEY, ASSIGNOR TO THE BABCOCK & WILCOX COMPANY, OF BAYONNE, NEW JERSEY, A CORPORATION OF NEW JERSEY.

BOILER-GAUGE GLASS.

Application filed October 20, 1924. Serial No. 744,534.

Figure 1:
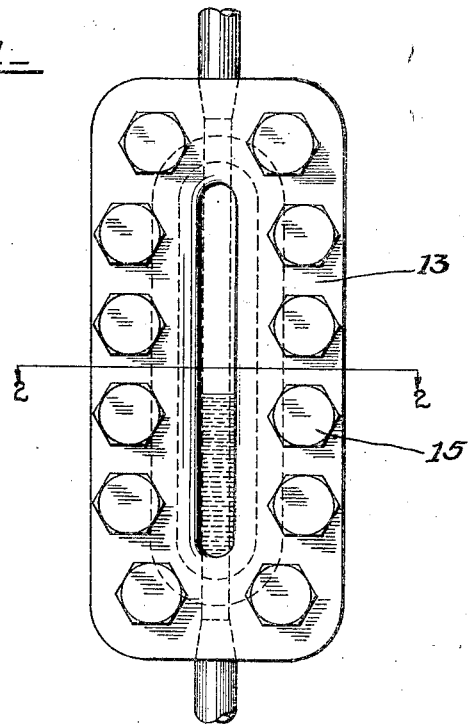
Figure 2:
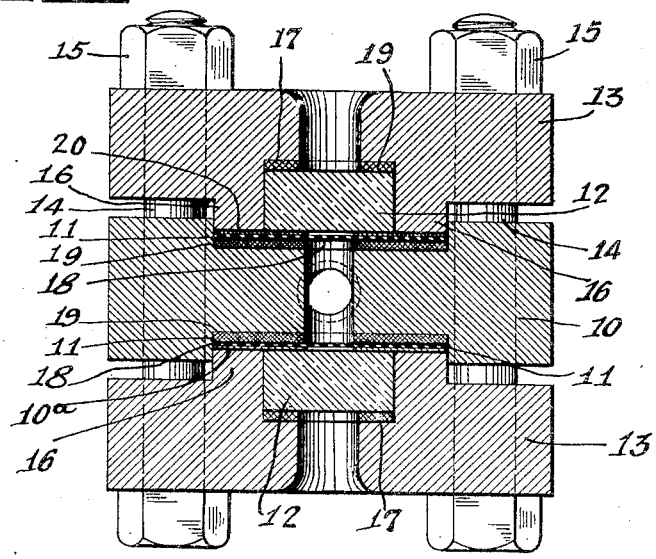

My invention relates to boiler gauge glasses and will best be understood by reference to the following detailed description and accompanying drawings, in which Fig. 1 is a front view of an illustrative embodiment of my improved device, and Fig. 2 is an enlarged sectional view taken on the line 2—2 of Fig. 1.

Referring to Fig. 2, 10 denotes a holder member having an internal opening or cavity 10$^a$ for the reception of the boiler water and which is provided with seats 11, 11, each of which is adapted to receive, with suitable packing intervening, a sight glass 12. A pair of clamping members 13, 13 hold the sight glasses in place, being provided with recesses for the glasses 12. The clamping members are joined to holder member 10 by means of bolts 14 and nuts 15, which hold the parts in assembled relation.

Each clamping member 13 includes a gland 16 surrounding a sight glass 12, and also an internal shoulder 17 which prevents outward movement of glass 12. It will be noted that the thrust of each gland 16 is directed against the opposing seat 11 of holder member 10, and that the bearing surface of each gland is approximately flush with the inner surface of the sight glass. In order to seal the gaps between the edges of each sight glass 12 and its surrounding gland 16, I provide a thin, flexible, transparent strip 18 (shown in cross section in Fig. 2 by the heavy cross hatching), preferably of mica, extending across each seat 11 including the opening 10$^a$. Suitable packing 19 is disposed between each mica strip and the corresponding seat 11, and also between each glass and the corresponding shoulder 17 forming the bottom of the recess.

The sight glasses 12 are preferably ground so that there is but slight clearance between them and the surrounding glands 16. In order, however, to dispense with the need of having the glasses accurately ground, and further to insure the sealing action of the transparent strip, I preferably insert a thin metallic strip 20, for example, a brass or steel strip .001″ in thickness, next to and outside the sealing strip 18 and bridging the gap between the glass 12 and gland 16 and having an opening corresponding to the opening 10$^a$. The thickness of each sight glass 12 is less than the distance from the shoulder 17 to the bearing surface of the gland 16, and when the device is assembled, the thickness of the packings 19 engaging the shoulders 17 and the seats 11 is so chosen that when pressure is applied to the holder members by screwing down the nuts 15, only a comparatively slight pressure is placed upon the sight glasses 12. This permits the pressure exerted by the glands 16 to be as great as may be desired without fear of straining or breaking the sight glasses. The inner face of each glass will, however, furnish a bearing surface to reinforce the mica strip and the metallic strip against the pressure of steam in the cavity 10$^a$, this pressure of course being exerted outwardly.

By reason of my improved construction, therefore, a thoroughly tight setting for the sight glasses is provided without there being any greater strain upon the glasses themselves than the boiler pressure, so that water gauges of my construction may be used with boilers operating under extremely high pressures without depending on pressure transmitted through the sight glass to secure a tight joint, as has heretofore been the practice. Moreover, in addition to its sealing effect, the mica strip or other material used serves the additional function of protecting the sight glass or glasses from corrosion from the boiler water. A further advantage lies in the fact that due to the metallic strip or liner next to the transparent strip, the sight glasses used need not be ground to an exact fit.

While I have shown a gauge in which the water level may be determined from either side, it will be understood that a single sight glass only may be used.

While preferably I combine in one member the glass holding and the seal clamping devices, it will be understood that these devices may be quite independent of each other, if desired. For example, a separate glass holding device may be attached to clamping member 13 (instead of the integral shoulder 17) and caused to exert the necessary pressure on the outside of the glass by means of separate bolts studded in member 13.

I claim:—

1. In a water gauge, a sight glass, a holder member therefor, a flexible transparent sealing member adjacent a face of the glass and extending outside the edges of said glass and a clamping member on the side of the extending portion of said sealing member opposite said holder member, and means to draw said members together to clamp said sealing member independently of said sight glass.

2. A water gauge including a holder member having a cavity therein, a flexible transparent sealing member extending over said cavity, a sight glass outside the sealing member and extending over said cavity with the edges of said glass inside the edges of said sealing member, and means to press the edges of said sealing member outside the glass toward said holder member independently of said sight glass.

3. A water gauge including a holder member having a cavity therein, a flexible, transparent sealing member extending over said cavity, a sight glass outside the sealing member and extending over said cavity with the edges of said glass inside the edges of said sealing member, and a clamping member adapted to hold said sealing member and said glass to said holder member and having a portion thereof exerting a pressure on the edges of said sealing member and another portion exerting a less pressure on said glass.

4. A water gauge including a holder member having a cavity therein and a seat surrounding said cavity, a flexible transparent sealing member on said seat and extending over said cavity, a sight glass on said sealing member and extending over said cavity, with the edges of said glass inside of the edges of said sealing member, a clamping member surrounding said glass and having a relatively soft packing between the outer face of said glass and said clamping member and said clamping member contacting with the portion of said sealing member outside the edges of said glass, and means to draw said clamping member and said holder member together.

5. A water gauge including a holder member having a cavity therein and a seat surrounding said cavity, a flexible transparent sealing member on said seat and extending over said cavity, a sight glass on said sealing member and extending over said cavity, with the edges of said glass inside of the edges of said sealing member, the clamping member having a recess to receive said glass with the depth of said recess not less than the thickness of said glass and said clamping member contacting with the portion of said sealing member outside the edges of said glass, and means to draw said clamping member and said holder member together.

6. A water gauge including a holder member having a cavity therein, a flexible transparent sealing member extending over said cavity, a sight glass outside the sealing member and extending over said cavity with the edges of said glass inside the edges of said sealing member, means to clamp the edges of said sealing member to said holder member independently of said sight glass, and a thin metallic strip between said clamping means and said sealing member adjacent each edge of said sealing member and extending beneath the edges of said glass but not over the cavity.

7. A water gauge including a holder member having a cavity therein and a seat surrounding said cavity, a flexible transparent sealing member on said seat and extending over said cavity, a sight glass on said sealing member and extending over said cavity, with the edges of said glass inside of the edges of said sealing member, a clamping member having a recess to receive said glass with the depth of said recess not less than the thickness of said glass and said clamping member contacting with the portion of said sealing member outside the edges of said glass, a thin metallic strip between said clamping member and said sealing member adjacent each edge of said sealing member and extending beneath the edges of said glass but not over the cavity, and means to draw said clamping member and said holder member together.

8. In a water gauge, a pair of members, one of which has a cavity therein to receive the water, a flexible transparent sealing member extending over the cavity and having its edge portions tightly clamped between said members, a sight glass narrower than the sealing member and having one face adjacent and substantially parallel thereto, and means holding said glass in position.

9. In a water gauge, a pair of members, one of which has a cavity therein to receive the water, a flexible transparent sealing member extending over the cavity and having its edge portions tightly clamped between said members, a sight glass narrower than the sealing member and substantially parallel thereto, and means holding said glass in position.

10. A steam boiler water gauge comprising a holder member having a cavity therein, a flexible transparent sealing member extending over said cavity, a sight glass extending over said cavity with the edges of said glass inside the edges of said sealing member, and means to form a tight joint at the edges of said transparent sealing member independently of said sight glass.

11. A steam boiler water gauge comprising a holder member having a cavity therein, a flexible transparent sealing member extending over said cavity, a sight glass extending over said cavity with the edges of said glass inside the edges of said sealing member, means to form a tight joint at the edges of said transparent sealing member independently of said sight glass, and means to hold said sight glass in position so that it forms a bearing surface for said transparent sealing member, thereby enabling said transparent sealing member to withstand the steam or water pressure.

12. A steam boiler water gauge comprising a holder member having a cavity therein, a flexible transparent sealing member extending over said cavity, a sight glass extending over said cavity with the edges of said glass inside the edges of said sealing member, and means to form a tight joint at the edges of said transparent sealing member independently of said sight glass, said means holding said sight glass in position so that it forms a bearing surface for said transparent sealing member, thereby enabling said transparent sealing member to withstand the steam or water pressure.

13. A steam boiler water gauge comprising a member having a cavity therein, a flexible transparent sealing member disposed over said cavity, a sight glass also extending over said cavity and disposed exteriorly of said flexible member, means to hold said sight glass in position, and means to clamp said sealing member in position without exerting substantial pressure on said sight glass.

14. A steam boiler water gauge comprising a holder member having a cavity therein, a sight glass extending over said cavity, a flexible transparent sealing member disposed over said cavity between the glass and said holder member, a thin metallic plate disposed between said glass and said flexible sealing member around said cavity, and means to hold said parts in assembled relation.

15. A steam boiler water gauge comprising a holder member having a cavity therein, a sight glass extending over said cavity, a clamping member having a gland disposed around said glass with a surface substantially flush with the inner surface of said glass, a flexible sealing member disposed between said glass and gland on one side and said holder member on the other side, and a metallic plate bridging each gap between the glass and the gland and disposed on one side of the cavity.

16. A steam boiler water gauge comprising a holder member having a cavity therein, a sight glass extending over said cavity, a clamping member having a gland disposed around said glass with a surface substantially flush with the inner surface of said glass, a flexible sealing member disposed between said glass and gland on one side and said holder member on the other side, and a metallic plate bridging each gap between the glass and the gland and disposed on one side of the cavity between the flexible member on one side and the glass and gland on the other side.

17. A steam boiler water gauge comprising a holder member having a cavity therein, a sight glass extending over said cavity, a clamping member having a gland disposed around said glass with a surface substantially flush with the inner surface of said glass, a flexible sealing member disposed between said glass and gland on one side and said holder member on the other side, a metallic plate bridging each gap between the glass and the gland and disposed on one side of the cavity, and means to secure said parts in position without exerting substantial pressure on the sight glass.

18. A steam boiler water gauge comprising a holder member having a cavity therein, a sight glass extending over said cavity, a clamping member having a gland disposed around said glass with a surface substantially flush with the inner surface of said glass, a flexible sealing member disposed between said glass and gland on one side and said holder member on the other side, a metallic plate bridging each gap between the glass and the gland and disposed on one side of the cavity between the flexible member on one side and the glass and gland on the other side, and means to secure said parts in position without exerting substantial pressure on the sight glass.

HOWARD J. KERR.